D. W. McPROUD.
AUTOMATIC DEVICE FOR CORN PLANTERS.
APPLICATION FILED AUG. 10, 1912.
1,073,269.
Patented Sept. 16, 1913.
3 SHEETS—SHEET 1.
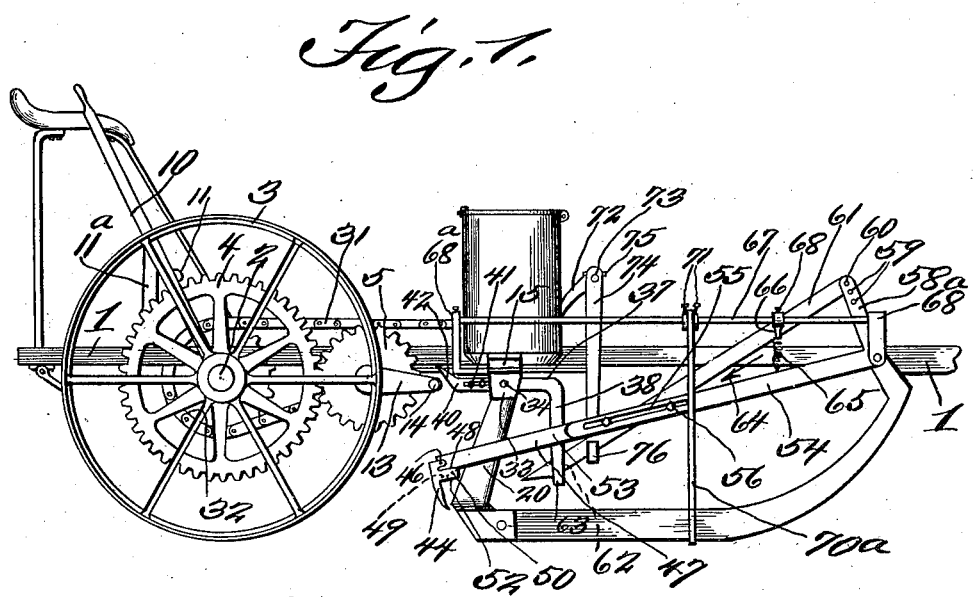
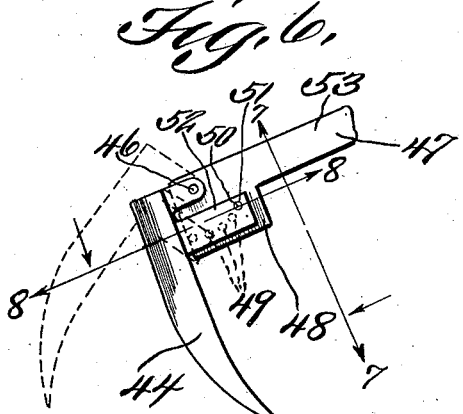
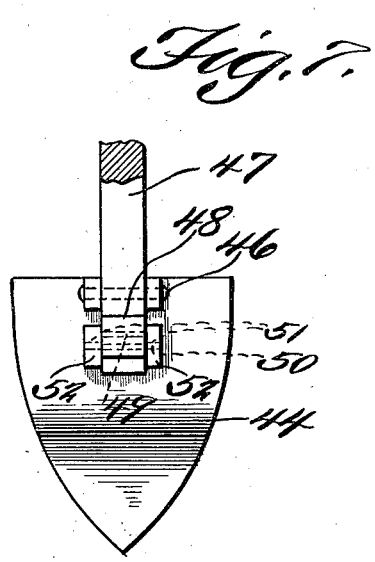
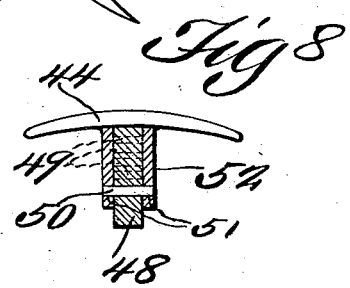

D. W. McPROUD.
AUTOMATIC DEVICE FOR CORN PLANTERS.
APPLICATION FILED AUG. 10, 1912.
1,073,269.
Patented Sept. 16, 1913.
3 SHEETS—SHEET 2.
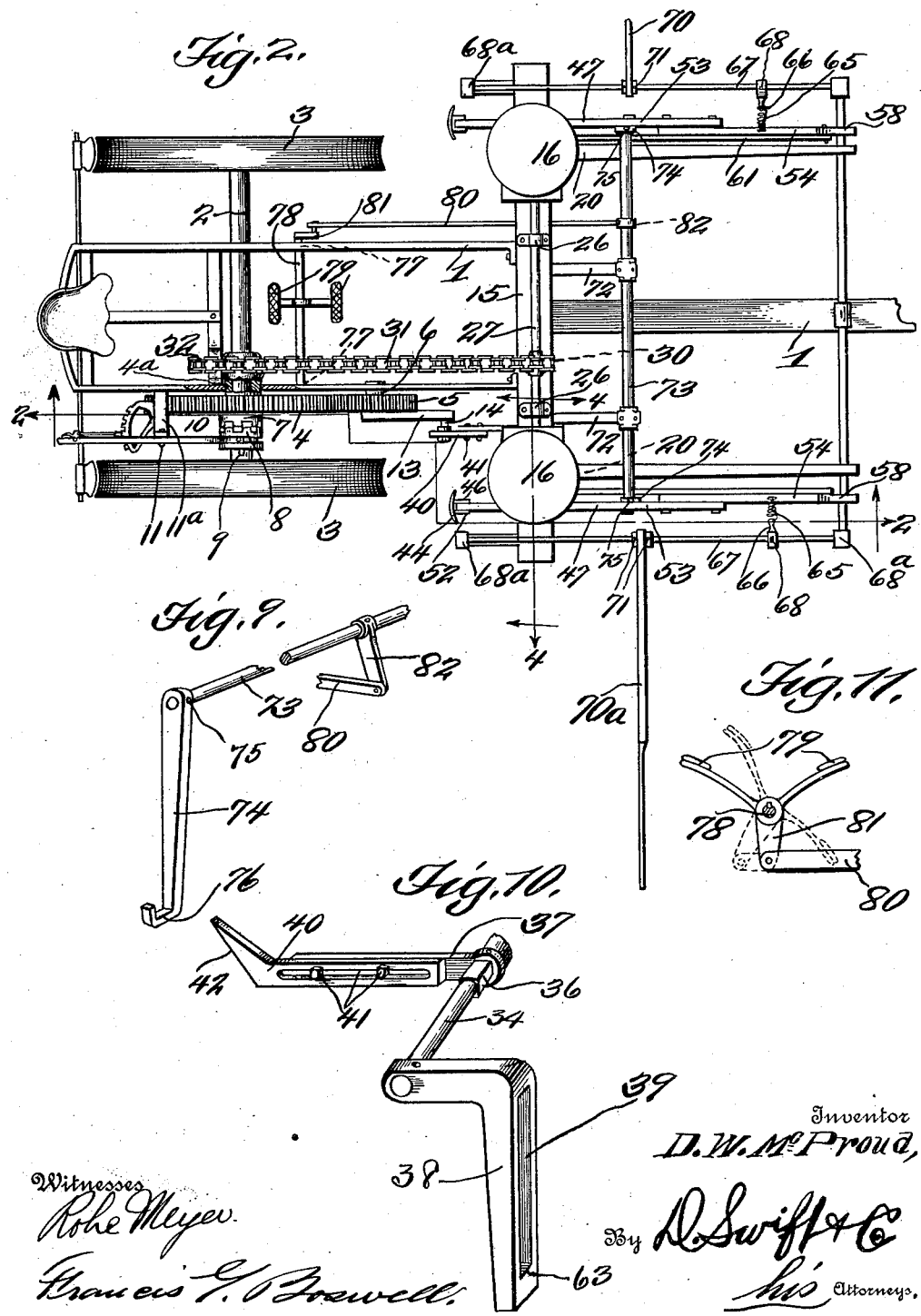

D. W. McPROUD.
AUTOMATIC DEVICE FOR CORN PLANTERS.
APPLICATION FILED AUG. 10, 1912.
1,073,269.
Patented Sept. 16, 1913.
3 SHEETS—SHEET 3.
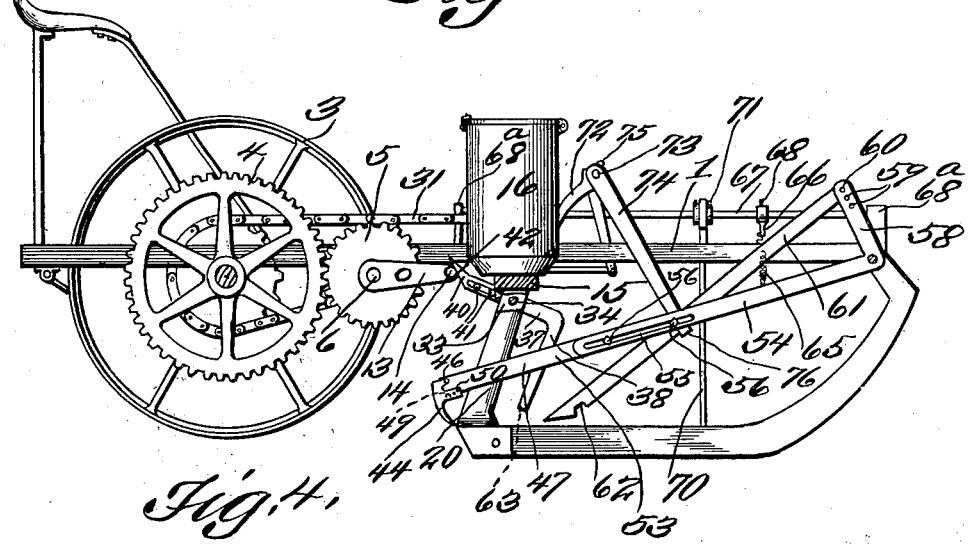

UNITED STATES PATENT OFFICE.

DAVID W. McPROUD, OF FARMLAND, INDIANA.

AUTOMATIC DEVICE FOR CORN-PLANTERS.

1,073,269.  Specification of Letters Patent.  Patented Sept. 16, 1913.

Application filed August 10, 1912. Serial No. 714,465.

*To all whom it may concern:*

Be it known that I, DAVID W. McPROUD, a citizen of the United States, residing at Farmland, in the county of Randolph and State of Indiana, have invented a new and useful Automatic Device for Corn-Planters; and I do hereby declare the following to be a full, clear, and exact description of the invention, such as will enable others skilled in the art to which it appertains to make and use the same.

This invention relates to an automatic attachment for corn planters.

It is the aim of the invention to provide an attachment, by the use of which on a corn planter, the chain or wire used for checking the corn is eliminated, thereby obviating the necessity of the operator dismounting the planter at each end of the field to stretch the chain or wire.

As a further object of the invention, it is the aim to provide markers for marking just where the corn or other seed is planted, adapting the same as a guide to plant the adjacent rows.

Another object of the invention is the provision of a guide 70ᵃ in starting planters.

Another object of the invention by the use of the aforesaid attachment or device, is to render the corn planter operative at all times, without the operator leaving the machine, thus saving time and facilitating the planting of corn, as well as making it easier to operate.

As a further object of the invention, means are provided for adjusting the marker.

Another object of the invention is to provide means whereby the distance between each hill of corn may be varied if desired.

In practical fields it may be found necessary to subject details of construction to alterations, to which the patentee is entitled, provided the alterations fall within the scope of what is claimed.

The invention comprises further features and combinations of parts, as hereinafter set forth, shown in the drawings and claimed.

In the drawings: Figure 1 is a view in side elevation of the improved device or attachment, as applied to a corn planter. Fig. 2 is a plan view. Fig. 3 is a longitudinal sectional view of the machine on line 2—2 of Fig. 2, showing the parts in elevation. Fig. 4 is a sectional view on line 4—4 of Fig. 2. Fig. 5 is a sectional view on line 5—5 of Fig. 4. Fig. 6 is a detail view of the side of one of the markers, showing how the shovel is adjustably connected thereto. Fig. 7 is a sectional view on line 7—7 of Fig. 6. Fig. 8 is a sectional view on line 8—8 of Fig. 6. Fig. 9 is a detail view. Fig. 10 is a detail view of the angle member, which is adapted to be rocked for operating the markers and at the same time opening the drop of the planters causing corn to be deposited at the same time the shovels gouge the soil. Fig. 11 is a detail view of the pedal, whereby the lever shown in Fig. 9 may be actuated. Fig. 12 is a diagrammatic view showing how the rows of corn are planted.

Referring more particularly to the drawings, 1 designates a frame, in bearings of which a shaft 2 is journaled having wheels 3. Also mounted upon the shaft or axle 2 is a drive gear 4, which meshes with the gear 5, mounted upon the stub shaft 6 carried by the frame 1. The drive gear 4 is provided with a clutch 7, with which the clutch member 8 is adapted to engage for throwing the drive gear in gear with the shaft or axle 2. The drive gear 4 is loosely mounted upon the shaft or axle 2, while the clutch member 8 is keyed thereto as at 9. The lever 10 pivoted at 11 to a projection of the frame 1 is provided for throwing the clutch member 8.

The gear 5 is provided with an arm 13 having a laterally extending lug 14. The frame 1 is constructed with a transversely disposed beam 15, upon which the seed or grain receptacles 16 are supported. The bottoms of the grain receptacles are provided with openings 17, from which passages 18 lead, as shown in Fig. 4. These passages 18, there only being one shown as in Fig. 4, communicate with the passages 19 of the boots 20, so that the seed or corn may pass therethrough. Mounted in each of the receptacles is a plate 21 having a single opening 22, which registers with the opening 17 of the bottom of each receptacle.

Revoluble between each plate 21 and each bottom of each receptacle is a feed plate 23 having a plurality of openings 24, as shown in Figs. 4 and 5, which register with the openings 17 and 22, as the plate 23 is rotated, thereby permitting the corn or other grain to feed to the boots. Mounted in bearings 26 of the beam 15 is a shaft 27, upon each end of which, there only being one shown, however, is a gear 28, as shown in Fig. 4, which engages the teeth 29 of the plate or disk 23, whereby the same may be rotated, in order that the openings 24 will register with the openings 17 and 22. In order to drive the shaft 27, a sprocket 30 is mounted thereon, and a sprocket chain 31 (which passes about the sprocket 32 and the sprocket 30) is designed to impart movement to the shaft 27, whereby the feed plates may be operated. The sprocket 32 as shown in Fig. 2 rotates with a sleeve $4^a$ of the gear 4, which sleeve, the clutch member 7 and the sprocket wheel on the sleeve all rotate as one body loosely on the shaft or axle 2. However, when the clutch member 8 (which is keyed to the axle 2) is thrown in clutch with the member 7, the wheels 3, the axle 2, the gear 4 including both of the clutch members and the sprocket wheel 32 all rotate as one body. It will be seen that just so soon as the clutch members are thrown in clutch, the chain 31, which passes about the sprocket wheel 32 will impart motion to the shaft 27, in order to constantly operate the feed mechanism. Although the feed mechanism is illustrated and described, it is to be remembered that the same forms no part of the present invention. It is also to be understood that this feed mechanism may be any suitable structure.

Mounted in brackets 33 of the beam 15, and extending parallel with but a slight distance below the beam 15 is a rocking rod 34, the reduced portions of which are mounted in the boots or tubes adjacent their upper ends, as shown in Fig. 4. The reduced portions are provided with cut-off disks 35, for checking or cutting off the flow of grain or corn through the passages 18 and 19. Parts of the reduced portions are rectangular in cross section, as shown at 36, and mounted on one of said rectangular portions is an arm member 37. Also upon the reduced portions, as shown in Fig. 10, are the arms 38 constructed with slots 39. To the horizontal arm member 37 an extension arm 40 is adjustably connected by a slot and bolts 41 and is constructed with an upwardly inclined portion 42, adapted to be contacted with by the lateral lug 14, whereby the arm 37 is actuated upwardly, so as to rock the rod or shaft 34, and owing to the cut-offs being movable with the shaft or rod, said cut-offs are opened. On examining the drawings, it will be observed that the feed plates operate to constantly permit the dropping of seed into the tube or boot 20, by way of the registering of the openings 24 with the openings 17 and 22. As the seed is dropped into the boot or tube, it is checked by the cut-off or valve 35, which is at intervals or intermittently tripped, by the lug 14 actuating the arm 37 upwardly, to hill drop, the arms 38 moving in such wise as to also operate the markers downwardly to gouge the soil.

When the lateral lug or pin 14 has completely passed the inclined portion 42 of the extension arm 40, and the arm member 37 has assumed its normal position, with the shovels 44 raised, the cut-offs 35 are closed. The shovels 44 gouge the soil on the outside of boots of planter just simply to indicate where seed was deposited, after which the wheels of planter covers the grain, and by so doing, the place where the corn is planted is marked. The shovels 44 are pivoted at 46 to the marker bars 47, the end portions of which are provided with enlargements 48, as shown in Fig. 6. These enlargements 48 are constructed with a plurality of apertures 49, any one of which are designed to receive the pin 50, which passes through the apertures 51 of the ears 52 of the shovels, in order to hold the shovels in adjusted positions. These pins 50 are to be made of wood or other fiber, so that in case the shovels come in contact with an obstruction, the pin will break, instead of straining the various parts of the machine. In this case a new pin may be easily substituted. The marker bars 47 are constructed in two sections 53 and 54, held together by slot and bolt connections 55 and 56. In this manner the section 53 may be extended, so that the locality of the shovels may be changed. The sections 54 of the marker bars at their forward end portions terminate in angle ends 58, which are provided with a series of apertures 59, any one of which receives the pin 60, which connects the bars 61 to the angle ends. The rear lower ends of the bars 61 are provided with notches 62, and are extended through the slots 39 of the arms 38, so that the notches will engage the transverse portions 63. When the angular members 37 are rocked, the bars 61 are pulled or moved in the direction of the arrow 64, so as to throw the marker bars including the shovels downwardly, so that the shovels will gouge the soil and make furrows. By the provision of the apertures 59 and the pins 60, the throw of the marker bars may be increased or decreased. When the marker bars are thrown downwardly, the springs 65 are put under tension. These springs 65 connect between the marker bars and the arms 66. These springs are to be of sufficient strength to not only raise the marker bars, but also return the angular members 37 to their initial positions. The arms 66 are adjustably secured upon the rods 67 by the set screws 68, so that the tension of the springs may be increased or decreased. The rods 67 are mounted in bearings 68$^a$ of the frame of the machine. To adjust the arms 66 they are to be swung vertically on the rods, and then tightened by the set screws 68. Mounted in supports 72 is a rocking rod 73, to which the levers 74 are held by the pins 75. These levers 74 are provided with lower hooked ends 76, which engage under the bars 61, so that when the shaft 73 is rocked, the arms 74 will in turn be moved, so as to disconnect the notches from the transverse portions 63 of the arms 38. Mounted in bearings 77 of the frame 1 is a rocking rod 78, to which the pedal 79 is fixed. When the pedal 79 is depressed, it will be rocked, which, in turn, will pull the connecting bar 80, which connects at one end to the arm 81 of the pedal 78, and at the other end to the arm 82 of the rods 73.

In order to plant corn or to hill drop the seed, without marking where the corn is planted, the operator may operate the pedals 79 in such wise as to pull upon the rod 80, and through the connection of the rod 80 to the arm 82 of the shaft 73, the shaft 73 will be rocked in such a manner as to throw the lower or hooked ends 76 toward the boots or tubes, which will disconnect the notches 62 of the bars 61 from the transverse portions 63 of the arms 38. After the arms 38 have been tilted or moved toward the boots or tubes, to the positions as shown in Fig. 3, the pedals 79 may be operated in a reverse direction, which will throw the lower or hooked ends 76 of the levers 74 away from the tubes or boots, to the positions shown in Fig. 3, thereby permitting the bars 61 to assume the positions disclosed in Fig. 3, out of connection with the arms 38. In this manner the seed is planted, without marking the location. To reconnect the bars 61 to the arms 38, the levers 74 may be oscillated toward the boot, which will raise the bar 61, in such positions, as to allow their notched ends to be received through the slots 39 of the arms 38, and then when the arms 38 are in their normal positions, the lever 74 may be moved only slightly in a direction away from the boots, in which case the notch 62 will engage the transverse portion 63 of the arms 38. When the bars 61 and the arms 38 are disconnected the seed or corn is dropped or planted in spaced apart hills.

The arm 37 and the extension arm 40 are so constructed, arranged and weighted that when the bars 61 and arms 38 are disconnected, the arm 37 and extension arm 40 will drop back automatically into place, with the upwardly inclined portion 42 in the path of the laterally projecting lug 14, so that the machine will hill-drop, and without marking. It is the purpose of this machine to hill-drop, regardless of whether or not the rows are marked, but if at any time it is desired, to drill, the inclined portion 42 of the extension arm 40 may be held out of the path of the lug 14, in any suitable manner, thereby holding the cut-off disks 35 continually opened. In this manner the machine may be used for drilling, as well as hill-dropping. However, as in the first instance, every time the upwardly inclined portion 42 falls back in the path of the lug 14, the cut-off disks 35 are closed, so as to collect a certain amount of seed, and as the extension arm 40 is tilted, the cut-off disks are open, thereby allowing the collection of seed to drop. When planting corn, the parts of the machine are adjusted as desired, and then the same is driven forward, and when the clutch mechanism is thrown, so that the gear 4 and sprocket 32 will rotate with the wheels 3, motion will be imparted to the gear 5. In this manner the lug or pin 14 is brought intermittently in contact with the inclined surface 42 of the extension arm 40, so as to actuate the arm members 37 and the shaft 34.

It will be noted the feed plates operate constantly dropping seed into the tube or boot, where it is checked by the valve or cut-off 35, which is intermittently tripped, by the pin or lug 14 contacting with the extension of the arm 37, to hill drop, the tripper arm 38 also operating the marker, the shovels of which gouge the soil. Upon the return of the arm 37 and the tripper arms 38 to their normal position, the cut-offs or valves 35 are closed, and the markers raised. Two rows of corn are planted at one time, as shown in Fig. 12, and when the two rows $c$ and $d$ are being planted, the machine moving in the direction of the arrow 83, the member 70$^a$ is projecting to engage the rows $a$ and $b$ previously planted, and when the rows $e$ and $f$ are being planted, the machine still moving in the same direction, as indicated by the arrow 85, the member 70 is projecting to engage the rows $c$ and $d$, and so on until the entire field of corn is planted, unless the said members 70 and 70$^a$ are thrown up. The members 70 and 70$^a$ are long enough to engage the rows as shown in Figs. 1 and 2, whereby the machine may be guided. These members 70 and 70$^a$ are carried by sliding collars 71, which are secured by any suitable means (not shown) on the rods 67.

In starting the planter, set the same with guiding fingers 70 and 70$^a$ in the furrows or gouges made by markers. As the machine moves forward and the clutch is thrown in gear, it will impart motion to the gear 4 and sprocket 32, which in turn imparts motion to the gear 5, until the pin 14 comes in contact with the inclined portion 42 of the arm 40, thereby opening the cut-offs, so that the grain will be deposited. The guiding fingers can be thrown to vertical positions, if desired, by means of a hook or wire carried by the operator, so as to prevent the fingers from coming in contact with any obstruction, that may be in their path.

From the foregoing, it will be noted that there has been produced a novel form of attachment or device applicable to corn planters, and one which has been found particularly desirable and practical, because of the elimination of the use of a wire or chain, and, furthermore, obviating the necessity of the operator dismounting from the corn planter to string a check wire or chain.

The invention having been set forth, what is claimed as new and useful is:—

1. In combination with a corn planter including a feed mechanism and grain boots, cut-offs in the boots, yieldably supported markers, and means adapted to simultaneously actuate the markers and open the cut-offs at intervals during the actuation of the feeding mechanism, the yieldably supported markers constituting means to return the first means to its normal position to close the cut-offs, and a mechanism for throwing the markers out of operation.

2. In combination with a corn planter including a feed mechanism and grain boots, cut-offs in the grain boots, yieldably supported marker bars having shovels to gouge the soil, members adapted to be actuated to open the cut-offs at intervals during the feed, connections between the marker bars and the members whereby the marker bars are actuated simultaneously with the opening of the cut-offs, the yieldably supported marker bars and their connections with the members constituting means to return said members to their normal positions to close the cut-offs, and a mechanism adapted to be actuated to disconnect the connection from the members to throw the marker bars out of operation.

3. In combination with a corn planter including a feed mechanism and grain boots, cut-offs in the grain boots, yieldably supported marker bars having shovels to gouge the soil, members adapted to be actuated to open the cut-offs at intervals during the action of the feed mechanism, connections between the marker bars and the members whereby the marker bars are actuated simultaneously with the opening of the cut-offs, the yieldably supported marker bars and their connections with the members constituting means to return said members to their normal positions to close the cut-offs, and fingers adapted to engage said connections, thereby constituting disengaging means for the markers.

4. In combination with a corn planter including a feed mechanism and grain boots, cut-offs in the grain boots, pivoted marker bars having shovels to gouge the soil, yielding means to support the marker bars, members, one of which is provided with an extension arm and adapted to be actuated to open the cut-offs at intervals during the actuation of the feed mechanism, each marker bar having a connection with a member whereby the marker bars may be actuated simultaneously with the opening of the cut offs, the yielding means and the connections combined constituting means for returning the members to their normal positions to close the cut-offs.

5. In combination with a corn planter including a feed mechanism and grain boots, cut-offs in the grain boots, pivoted sectional adjustable marker bars having yielding means to support the marker bars in upper positions, a rockable device having members provided with slotted arms, said members adapted to be actuated to open the cut-offs at intervals during the actuation of the feed mechanism, connections between the marker bars and the slotted arms whereby the marker bars may be actuated simultaneously with the opening of the cut-offs, the yielding means and the connection constituting means to return the members to their normal positions to close the cut-off.

6. In combination with a corn planter including a feed mechanism and grain boots, cut-offs in the grain boots, pivoted sectional adjustable marker bars having yielding means to support the marker bars in upper positions, a rockable device having members and provided with slotted arms, said members adapted to be actuated to open the cut offs at intervals during the actuation of the feed mechanism, connections between the marker bars and the slotted arms whereby the marker bars may be actuated simultaneously with the opening of the cut-offs, the yielding means and the connection constituting means to return the members to their normal positions to close the cut-off, and a mechanism for disconnecting the connections with the slotted arms to throw the marker bars out of operation.

7. In combination with a corn planter including a feed mechanism and grain boots, cut-offs in the boots, suspended marker bars having shovels, members, one of which is provided with an adjustable extension arm, and adapted to be actuated to open the cut-offs at intervals during the actuation of the feed mechanism, means having adjustable connections with the marker bars and connected to the members, whereby when the members are actuated, the marker bars will be thrown downwardly simultaneously with the opening of the cut-offs, yieldable means to support the marker bars, and constituting means combined with the adjustable connecting means to return said members to their normal positions to close the cut-offs, and a mechanism for disconnecting the first mentioned means from said members to throw the marker bars out of operation.

In testimony whereof I have signed my name to this specification in the presence of two subscribing witnesses.

DAVID W. McPROUD.

Witnesses:
PAUL R. MOORE,
TASWELL C. RAPE.

Copies of this patent may be obtained for five cents each, by addressing the "Commissioner of Patents, Washington, D. C."